UNITED STATES PATENT OFFICE 2,687,314

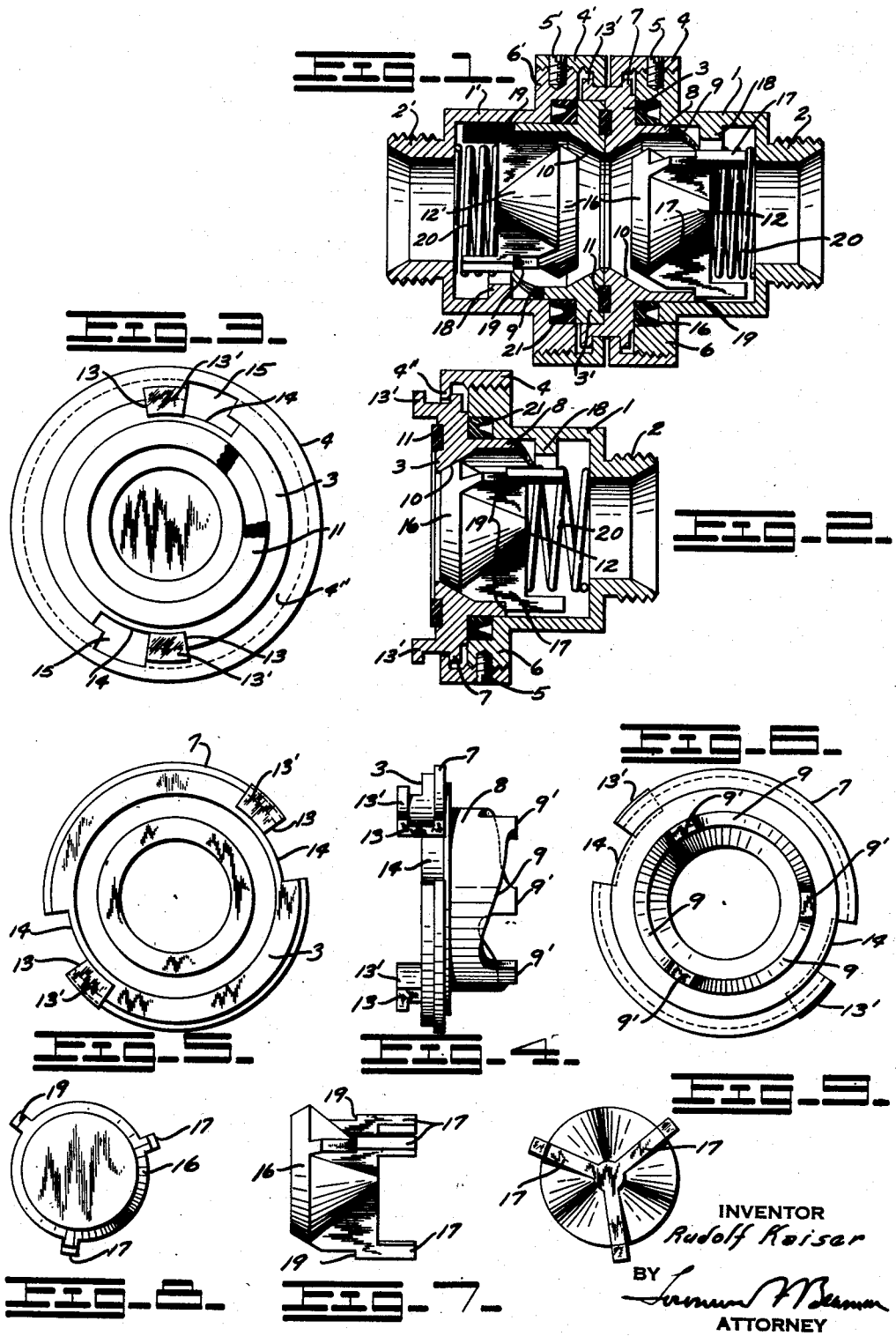

SELF-SEALING COUPLING

Rudolf Kaiser, Ettlingen, Baden, Germany, assignor to Aeroquip Corporation, Jackson, Mich., a corporation of Michigan Application June 26, 1950, Serial No. 170,306

1 Claim. (Cl. 284—11)

The present invention relates to self-sealing couplings for use with flexible hose and rigid tubing. This type of coupling eliminates the loss of fluid and permits re-connection of lines without induction of air into the system. The known embodiments of self-sealing couplings, with poppet valves and the like as sealing elements, are somewhat complicated and expensive. In addition, the two coupling parts, or halves, are usually screwed together and can only be connected or disconnected through the use of wrenches, or the like.

It is an object of the present invention to eliminate, to a great extent, some of the inherent disadvantages in the conventional coupling design of the aforesaid type and by a simplified construction permit quick connection and disconnection without the use of tools.

The above and other objects and advantages of the invention residing in the construction, arrangement and combination of parts will appear clear from consideration of the following description with reference to the accompanying drawings and from the appended claims.

In the drawings:

Figure 1 is a longitudinal section through a coupling construction in accordance with the invention showing the two coupling parts in the fully connected condition, and with the poppet valves and their associated return springs being shown in elevation for convenience of illustration, Figure 2 is a longitudinal section of the coupling part shown on the right of Fig. 1, Figure 3 is an end view looking on the left-hand end of Figure 2, Figure 4 is a side elevational view of the valve actuator as seen in Figure 2, but removed from its coupling body part, Figure 5 is an end view looking on the left-hand end of Figure 4, Figure 6 is an end view looking on the right-hand end of Figure 4, Figure 7 is a side elevational view of the poppet valve as seen in Figure 2 but removed from its coupling body part, Figure 8 is an end view looking on the left-hand end of Figure 7, and Figure 9 is an end view looking on the right-hand end of Figure 7.

Referring to the drawings, the coupling comprises a pair of identical hollow cylindrical body parts 1 and 1', containing valve actuators 3, 3' and poppet valves 12, 12', respectively.

The body parts have externally screw-threaded end portions 2, 2', by which the body parts can be connected to the ends of a pair of hose sections (not shown), and, in addition, the body parts have externally screw-threaded portions 6, 6' upon which rings 4, 4' are screwed and secured against rotation relatively to their body parts as by grub screws 5, 5'.

As indicated, each coupling part is of identical construction, so only one such part need be described in detail, for which purpose the right-hand coupling part has been selected and is illustrated in detail with reference to Figures 2 to 9.

In Figure 1, the same references have been applied to portions of the left-hand coupling part which corresponds with portions of the right-hand coupling part described with reference to Figures 2 to 9.

Referring now to Figures 2 to 9, as stated the body part 1 contains the valve actuator 3 and the poppet valve 12, the valve being shown in elevation.

The valve actuator 3 comprises a cylindrical end portion, having an annular flange 7 and a cylindrical body portion 8 having a rear end edge formed to provide a series of cam surfaces 9. Three cam surfaces are shown, each of identical shape and direction and separated around the said edge by stops 9'. The valve actuator also has an internal conical valve seat 10 and carries on its front end surface a sealing ring 11. Extending from said front end surface there are a pair of diametrically opposite claw portions 13, which are of arcuate shape, as seen in Figures 3, 5 and 6, and provide outwardly projecting flange portions 13'.

The body part 8 of the valve actuator 3 is slidably fitted into the body part 1 and is retained therein by the inwardly directed flange 4" on the ring 4 engaging in front of the flange 7. 21 (Figures 1 and 2) indicates a U-section packing ring retained between the body part 8 of the valve actuator and the body part 1.

The flange 7, adjacent each claw 13 is formed with an arcuate slot 14 of arcuate extent in excess of the arcuate extent of the claw. Each slot 14 coincides with an arcuate slot 15 (Figure 3) formed on the inner edge of the flange 4" of the ring 4, there thus being two diametrically opposite slots 15 and these being of substantially the same arcuate extent as the claws 13.

The poppet valve 12 has an exterior conical surface 16, which seats against the surface 10 within the actuator 3, and extending rearwardly from the surface 16 the valve has radial ribs 17 (three being shown in Figures 7 and 9) which ribs are guided for axial motion with respect to guide channels formed within an inwardly directed annular flange 18 on the body part 1 and are formed with shoulders 19 which, by the action of spring 20, are maintained in constant engagement with the cam surfaces 9 on the actuator 3.

It will be appreciated from consideration of the foregoing description that each coupling part comprises a cam surfaced valve actuator mounted within a body part so as to permit relative rotation to take place between the valve actuator and the body part and that a poppet valve provided within each body part is maintained in constant engagement with cam surfaces on the valve actuator so as to be capable of partaking of axial opening and closing movement while being prevented from rotating relatively to the body part.

In operation, prior to connection of the parts 1, 1' both valves 12, 12' are at the low side of the cam surfaces 9. For connection of the parts, one of the body parts, the body part 1, for example, is held against rotation and the other body part 1 is rotated clockwise. As above described, the valves in both parts can only move axially due to the engagement of the ribs 17 in the guide channels in their respective parts. The actuators 3, 3', after initial locking movement to engage the claw flanges 13 behind the flanges 4'', will be fixed relative to each other. Therefore, if the actuators 3, 3' remain fixed relative to the part 1', the shoulders 19 on the valve in the part 1 will be rotated relative to the cam surfaces 9 and thereby open the valve in the part 1. Engagement of the shoulders 19 with the stops 9' will cause the actuators 3, 3' to be rotated with the part 1, thereby moving the cam surfaces in the part 1' relative to the valve in this part so that this valve is opened. Assuming that the actuators 3,3' rotate with the part 1, the valve in part 1' will travel along its corresponding cam surfaces until the valve is opened and abuts the stops 9'. Then the actuators 3, 3' will be held against rotation relative to part 1 and continued rotation will result in the valve shoulders 19 in part 1 moving along the cam surfaces in that part until the valve is opened. The construction and arrangement is such that the sequence in which the valves open is not predetermined.

Having thus described my invention what I claim as new and desire to be covered by Letters Patent is:

A separable pipe coupling comprised of a pair of similar hollow body parts, the body parts each having a fluid passage therethrough, a valve in each fluid passage, and a hollow member mounted in each part, means on each member and its respective part rotatably securing the member within the part, and means rotatably and releasably locking each member and the part carrying the other member together, and means on said members holding said members against rotation relative to each other after said locking means have been engaged, a valve seat in each member adjacent the end carrying said locking means and a resilient means interposed between each part and valve urging said valves toward their respective valve seats, means on each part and valve permitting axial movement of said valve and preventing rotation of each valve relative to its respective part, a cam surface on each member engaged with said valve whereby the rotation of the respective part relative to its member moves the valve away from said valve seat, and stop means on said cam surface engaged by the valve after the valve has been opened to limit the rotational movement of said valve relative to said member, said engagement with the stop means constituting a driving means whereby one part, its respective member and valve and the member in the other part are rotated relative to the other part and its valve thereby opening the valve in the other part.

References Cited in the file of this patent

UNITED STATES PATENTS

| Number | Name | Date |
|---|---|---|
| 2,317,827 | Townhill | Apr. 27, 1943 |

FOREIGN PATENTS

| Number | Country | Date |
|---|---|---|
| 593,014 | Great Britain | Aug. 25, 1941 |
| 854,220 | France | Jan. 4, 1940 |
| 859,331 | France | June 3, 1940 |
| 874,879 | France | May 26, 1942 |
| 876,521 | France | Aug. 3, 1942 |